(12) United States Patent
Ih et al.

(10) Patent No.: US 6,564,164 B1
(45) Date of Patent: May 13, 2003

(54) METHOD FOR OPTIMALLY DETERMINING SENSOR POSITIONS FOR ACOUSTIC PYROMETRY

(76) Inventors: Jeong Guon Ih, 305-1032 Expo. Apartment, 474-1 Chunmin-dong, Yusong-gu, Taejon 305-390 (KR); Chul Min Park, 1-504 Seoul-Garden Apartment, 475 Shinwol-dong, Yangchun-gu, Seoul 158-092 (KR)

( * ) Notice: Subject to any disclaimer, the term of this patent is extended or adjusted under 35 U.S.C. 154(b) by 200 days.

(21) Appl. No.: 09/691,653

(22) Filed: Oct. 18, 2000

(30) Foreign Application Priority Data

Oct. 21, 1999 (KR) .......................................... 99-45742

(51) Int. Cl.[7] .............................................. G06F 15/00
(52) U.S. Cl. ......................... 702/134; 702/94; 702/196
(58) Field of Search ................................ 702/130, 134, 702/150, 94–95, 99, 196; 374/45, 121, 126–129, 131

(56) References Cited

U.S. PATENT DOCUMENTS

| | | | |
|---|---|---|---|
| 4,848,924 A | 7/1989 | Nuspl et al. ................ 374/119 |
| 5,459,668 A | * 10/1995 | Dogan et al. ............... 701/223 |
| 5,624,188 A | 4/1997 | West .......................... 374/119 |
| 5,868,496 A | * 2/1999 | Spitzberg .................... 374/128 |
| 5,963,311 A | * 10/1999 | Craig et al. .................... 356/43 |

* cited by examiner

Primary Examiner—Bryan Bui

(57) ABSTRACT

A method for optimally determining sensor positions for an acoustic pyrometry, capable of obtaining a minimum number of sensors satisfying a given error limit and determining positions of the obtained number of sensors for error minimization, in which a predetermined number of sensors are arbitrarily arranged on sides of a rectangular sectional area to be measured and a transfer matrix is calculated with respect to positions of all the sensors, with effective independence values obtained for respective paths of each of the sensors by performing singular value decomposition with respect to the calculated transfer matrix and a total effective independence value of each of the sensors is obtained by summing up the effective independence values obtained for the respective paths, followed by having a smallest one of the obtained total effective independence valves removed from among the sensors and the above steps are repeated until the number of the remaining sensors becomes equal to a target valve.

3 Claims, 15 Drawing Sheets

A: VIRTUAL SENSORS ARRANGED ARBITRARILY
B: SENSORS FINALLY SELECTED ACCORDING PRESENT METHOD

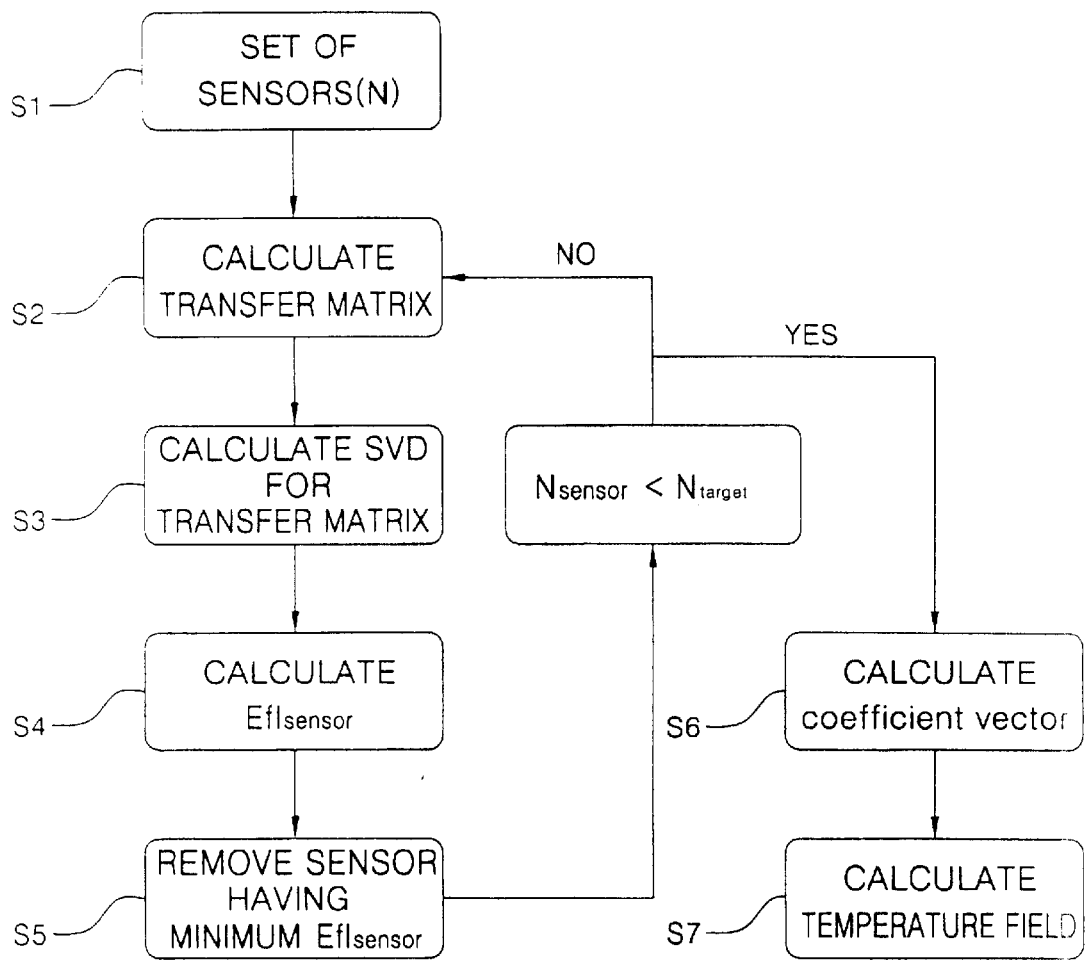

Temperature distribution T1 assumed for simulation

Temperature distribution T2 assumed for simulation

T1 measured using sensors of position 1

T1 measured using sensors of position 2

T1 measured using sensors of position 3

T1 measured using sensors of position 4

T1 measured using sensors of position Efl

T2 measured using sensors of position 1

T2 measured using sensors of position 2

T2 measured using sensors of position 3

T2 measured using sensors of position 4

T2 measured using sensors of position Efl

METHOD FOR OPTIMALLY DETERMINING SENSOR POSITIONS FOR ACOUSTIC PYROMETRY

BACKGROUND OF THE INVENTION

1. Field of the Invention

The present invention relates in general to a method for optimally determining sensor positions for an acoustic pyrometry, and more particularly to such a method which is capable of obtaining a minimum number of sensors satisfying a given error limit on the basis of an effective independence (EfI) method that is occasionally used for an acoustic holography or Indirect input measurement and determining positions of the obtained number of sensors suitable for error minimization.

2. Description of the Prior Art

As well known in the art, an acoustic pyrometry is a method useful to real-time measurement of temperature distributions on a two-dimensional sectional area. This pyrometry can be particularly useful in measuring a spatial temperature distribution and its time-based variations in a high-temperature place where a boiler is located or a harmful environment where a chemical reactor is located. For example, information regarding temperature distributions in a boiler used in a power plant is required in determining whether the boiler is abnormally operated and normally operating the boiler.

For measurement of temperature distributions in a boiler using the acoustic pyrometry, a plurality of acoustic emitters (also used as sensors) are mounted on the sidewall of the boiler and each of them senses sounds emitted from the others. Then, a sound propagation time based on the combination of the sensors is measured and subjected to an appropriate mathematical calculation process, thereby measuring a two-dimensional temperature distribution within the boiler, not a temperature at one point. At this time, an error of the measured temperature distribution is greatly influenced by the number and positions of the used sensors.

Now, a detailed description will be given of the basic principle of the above-stated acoustic pyrometry.

The acoustic pyrometry is a method for measuring a temperature in space using the fact that a propagation velocity of a sound is a function of the temperature. Namely, assuming that given conditions are a normal state, isentropic process, ideal gas, etc., it is well known from a continuity equation, momentum equation and state equation that the relation of the following equation 1 exists between the propagation velocity of the sound and the temperature.

$$C = \sqrt{\gamma RT} = K\sqrt{T} \quad \text{[Equation 1]}$$

where, C=acoustic velocity, T=temperature of medium [K], $$K = \sqrt{\gamma R} = \sqrt{\frac{c_p R_0}{c_v M}},$$

$\gamma$=specific heat ratio, $R_0$=gas constant and M=molecular mass.

Using the expression of the acoustic velocity in the above equation 1, it can be seen that the following equation 2 is established between a travel time t and travel distance dl of a sound pulse propagated within a sound field.

$$t = \frac{dl}{C(x,y)} = \frac{dl}{K\sqrt{T(x,y)}} \quad \text{[Equation 2]}$$

FIG. 1 is a graph illustrating the relation between sensor positions and a sound propagation path. Assuming that sensors are present respectively at two points $A(x_0, y_0)$ and $B(x_1, y_1)$ in a rectangular sectional area as shown in FIG. 1, calculation can be made with respect to time required for an acoustic wave emitted from the sensor at the point A to arrive at the sensor at the point B. Although the actual travel path of the acoustic wave is slightly curved from a straight line between the two points A and B because it is refracted due to a temperature gradient, it will be assumed to be a straight line. Hence, an arbitrary point on the path between the two points A and B can be expressed as in the following equation 3.

$$x(s) = x_0 + (x_1 - x_0)s$$
$$y(s) = y_0 + (y_1 - y_0)s \quad \text{[Equation 3]}$$

where, $$s = \frac{l}{L}, \quad \text{[Equation 3]}$$

$$L = \sqrt{(x_0 - x_1)^2 + (y_0 - y_1)^2} \quad (0 \leq s \leq 1).$$

In the above equation 3, L is the distance between the two points A and B and l is the distance between the arbitrary point on the path and the point A. Dividing the x-coordinate system and y-coordinate system in the equation 3 respectively by lengths X and Y, dimensionless coordinate systems u and v can be obtained as in the below equation 4.

$$u = \frac{x}{X}, v = \frac{y}{Y} \quad \text{[Equation 4]}$$

where, $u(s) = u_0 + (u_1 - u_0)s$, $v(s) = v_0 + (v_1 - v_0)s$ $(0 \leq s \leq 1)$.

Because the temperature is a function of the position (x,y), or (u,v), the acoustic velocity is defined as a function of the position, too.

Accordingly, substituting (x, y) in the above equation 2 with (u, v) and integrating both sides on the basis of ds (or dl), the travel time of the sound can be expressed as in the following equation 5.

$$t = L \int_0^1 \frac{ds}{C(u,v)} = L \int_0^1 F(u,v) \, ds \quad \text{[Equation 5]}$$

where, $$F(u,v) = \frac{1}{C(u,v)}.$$

Expressing F(u, v) in the above equation 5 as a Fourier series, the result is:

$$F(u,v) = \frac{1}{K\sqrt{T(u,v)}} = \sum_m \sum_n A_{mn} G(mu) H(nv) \quad \text{[Equation 6]}$$

In the above equation 6, G and H are admissible functions, which can be defined respectively as G=cos(mu) and H=cos (nv) in a rectangular sectional area. Substituting the equation 5 with the equation 6, the result is:

$$t = \sum_m \sum_n A_{mn} f_{mn} \qquad \text{[Equation 7]}$$

where, $f_{mn} = L \int G(mu)H(nv)ds$, and m and n are dummy indexes.

Assuming that the number of sensors is N and the number of paths of each of the sensors is p, respective travel times t can be experimentally obtained as p simultaneous equations (p equations 7), which can be expressed in matrix as in the below equation 8.

$$[f]_{p \times q} \{A\}_{q \times I} = \{t\}_{p \times I} \qquad \text{[Equation 8]}$$

In the above equation 8, $\{A\} = \{A_{00}, A_{01}, A_{10}, A_{02}, A_{11}, A_{20}, \ldots\}$, and q is the number of coefficient terms taken for sufficient convergence of the Fourier coefficient A and must be smaller than or equal to p.

A Fourier coefficient vector $\{A\}$ can be obtained from the measured time as in the following equation 9.

$$\{[f]^T\}_{q \times p}[f]_{p \times q}\{A\}_{q \times I} = \{[f]^T\}_{q \times p}\{t\}_{p \times I}\{A\}_{q \times I} = \{\{[f]^T\}_{q \times p}[f]_{p \times q}\}_{q \times q}^{-1}\{\{[f]^T\}_{q \times p}\{t\}_{p \times I}\}_{q \times I} \qquad \text{[Equation 9]}$$

For example, for temperature measurement on a rectangular plane, $f_{mn}$ is expressed as in the following equation 10.

1) If $m = n = 0$, $f_m = L$.   [Equation 10]

2) If $m(u_1 - u_0) - n(v_1 - v_0) = 0$, $$f_{mn} = \frac{L}{2}\left\{\cos(mu_0 - nv_0) + \frac{\sin(mu_1 + nv_1) - \sin(mu_0 + nv_0)}{m(u_1 - u_0) + n(v_1 - v_0)}\right\}.$$

3) If $m(u_1 - u_0) + n(v_1 - v_0) = 0$, $$f_{mn} = \frac{L}{2}\left\{\cos(mu_0 + nv_0) + \frac{\sin(mu_1 - nv_1) - \sin(mu_0 - nv_0)}{m(u_1 - u_0) - n(v_1 - v_0)}\right\}.$$

4) In other cases, $$f_{mn} = \frac{L}{2}\left\{\frac{\sin(mu_1 + nv_1) - \sin(mu_0 + nv_0)}{m(u_1 - u_0) + n(v_1 - v_0)}\right\} + \frac{\sin(mu_1 - nv_1) - \sin(mu_0 - nv_0)}{m(u_1 - u_0) - n(v_1 - v_0)}.$$

As a result, the temperature distribution T(u,v) in the above equation 6 can be expressed as in the below equation 11.

$$T(u, v) = \frac{1}{\{K \sum \sum A_{mn} \cos(mu)\cos(nv)\}^2} \qquad \text{[Equation 11]}$$

The two-dimensional temperature distribution can be measured in the above manner. At this time, an error of the measured temperature distribution is greatly influenced by the number and positions of sensors. That is, different temperatures are measured according to positions of sensors and the measured temperature values are different in accuracy according to the number of the sensors. In the worst case, a temperature distribution to be measured may not be found or the measured results of the temperature distribution may express preposterous values. In this regard, how many sensors will be used and how the sensors will be arranged become issues. However, approaches to such issues have not been proposed by conventional studies and patents.

SUMMARY OF THE INVENTION

Therefore, the present invention has been made in view of the above problems, and it is an object of the present invention to provide a method for optimally determining sensor positions for an acoustic pyrometry, which is capable of obtaining a minimum number of sensors satisfying a given error limit on the basis of an effective independence method that is occasionally used for an acoustic holography or indirect input measurement and determining positions of the obtained number of sensors suitable for error minimization, so that temperature distributions can accurately be measured.

In accordance with the present invention, the above and other objects can be accomplished by a provision of a method for optimally determining sensor positions for an acoustic pyrometry, comprising the first step of arbitrarily arranging a predetermined number of sensors on sides of a rectangular sectional area to be measured; the second step of calculating a transfer matrix with respect to positions of all of the sensors; the third step of obtaining effective independence values of respective paths of each of the sensors by performing singular value decomposition with respect to the calculated transfer matrix; the fourth step of obtaining a total effective independence value of each of the sensors by summing up the obtained effective independence values of the respective paths; the fifth step of removing one having a smallest one of the obtained total effective independence values from among the sensors; and the sixth step of repeating the above second to fifth steps until the number of the remaining sensors becomes equal to a target value.

Preferably, the above target value may be set to be larger than a minimum number of the sensors, which is found by calculating variations in a conditional number of the transfer matrix while the sensors are reduced in number and detecting a point where the conditional number increases abruptly or a minimum point from a curved line obtained as a result of the calculation.

In a main feature of the present invention, there is provided a method for optimally determining sensor positions for an acoustic pyrometry, which is capable of obtaining a minimum number of sensors satisfying a given error limit and determining positions of the obtained number of sensors suitable for error minimization. Effective independence values are obtained from a transfer matrix representative of geometrical relations among sensor positions and propagation characteristics thereof and optimal sensor positions are determined on the basis of the obtained effective independence values. A desired minimum number of sensors is determined by observing variations in a condition number reflecting an error of the transfer matrix.

BRIEF DESCRIPTION OF THE DRAWINGS

The above and other objects, features and advantages of the present invention will be more clearly understood from the following detailed description taken in conjunction with the accompanying drawings, in which:

FIG. 3 is a flowchart illustrating a method for optimally determining sensor positions for an acoustic pyrometry in accordance with the present invention;

DETAILED DESCRIPTION OF THE PREFERRED EMBODIMENTS

Figure 1:
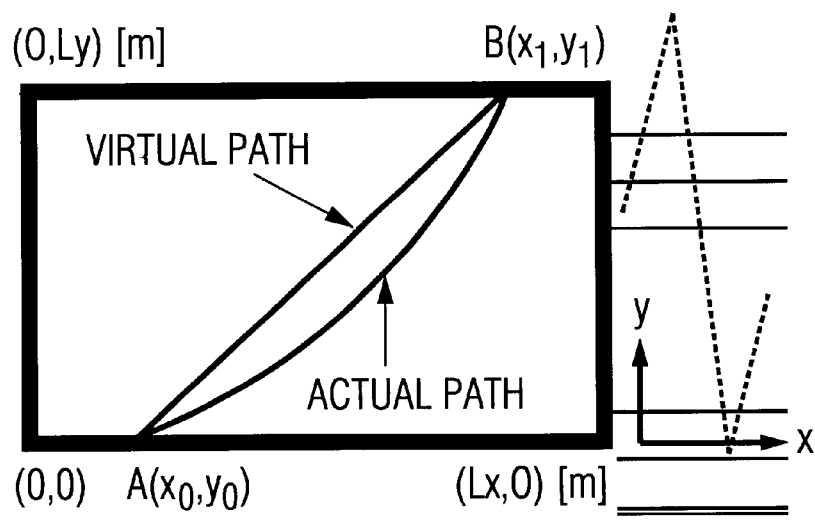
FIG. 1 is a graph illustrating the relation between sensor positions and a sound propagation path.
Figure 2:
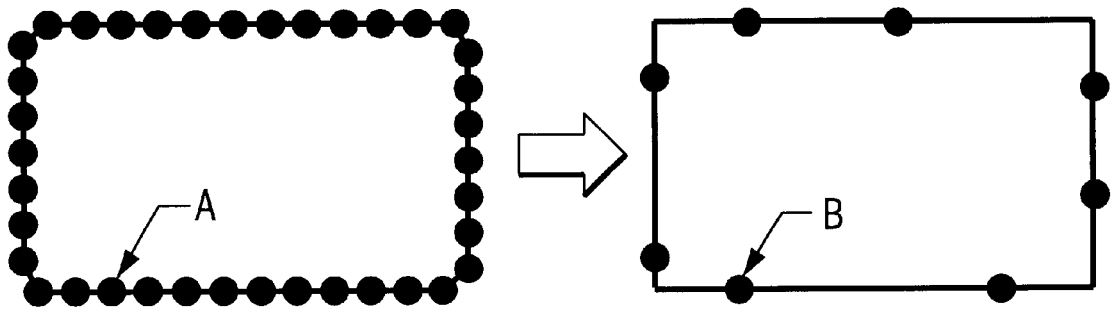
FIG. 2 is a view illustrating the concept of a reduction in the number of sensors based on an effective independence method.

FIG. 2 is a view illustrating the concept of a reduction in the number of sensors based on an effective independence (EfI) method.

As shown in FIG. 2, initially, a larger number of virtual sensors than that of sensors to be actually used are arranged on a sidewall, a transfer matrix is calculated from positions of the virtual sensors and EfI values of the respective virtual sensors are calculated from the calculated transfer matrix. Then, an EfI value is calculated with respect to an obtained, overdetermined transfer matrix $[f]_{p \times q}$, as will hereinafter be described in more detail.

First, obtaining singular vectors (Λ), U and V having mutual orthogonality with singular values through singular value decomposition (SVD), the results are:

$$[f]_{p \times q} = [U]_{p \times p}[\Lambda]_{p \times q}[[V]_{q \times q}]^T \quad \text{[Equation 12]}$$

where, $$[\Lambda]_{p \times q} = \begin{bmatrix} \Lambda_1 & 0 & 0 & 0 \\ 0 & \Lambda_2 & 0 & 0 \\ 0 & 0 & O & 0 \\ 0 & 0 & 0 & \Lambda_q \\ 0 & 0 & 0 & M \\ 0 & 0 & 0 & 0 \end{bmatrix}$$

$$\Lambda_1 \leq \Lambda_2 \leq \Lambda \leq \Lambda_q, \ \{u_i\}^H\{u_j\{=\delta_{ij},\ \}v_i\}^H\{v_j\}=\delta_{ij} \quad \text{[Equation 13]}$$

The EfI value of each path can be defined on the basis of the right singular vector U as in the following equation 14.

$$[EfI_{path}] = [U_q][U_q]^T \quad \text{[Equation 14]}$$

The above equation 14 signifies that a sensor having a smallest EfI value provides a smallest amount of information in rearranging a two-dimensional temperature field. Generally, a sensor providing a smallest amount of Information can be regarded as surplusage (i.e., a removable sensor) in the entire system. In other words, such a sensor can be physically analyzed as providing information nearly analogous to information provided from other sensors.

Therefore, sensor positions are selected by removing the above sensor. Namely, a physical meaning of the EfI value is the amount of information provided from each path for rearrangement of a temperature field. The total EfI value $EfI_{sensor}$ of an associated sensor can be defined on the basis of EfI values $EfI_{path}$ of respective paths as in the below equation 15.

$$EfI_{sensor} = \sum_{path} EfI_{path} \quad \text{[Equation 15]}$$

Then, sensors making no contribution to the measurement of a temperature field can be found on the basis of EfI values $EfI_{sensor}$ of respective sensors defined as in the above equation 15.

Now, a detailed description will be given of a method for optimally determining sensor positions for an acoustic pyrometry in accordance with the present invention with reference to FIG. 3.

FIG. 3 is a flowchart illustrating a method for optimally determining sensor positions for an acoustic pyrometry in accordance with the present invention.

As shown in FIG. 3, a predetermined number of sensors, or N sensors, are arbitrarily arranged on sides of a rectangular sectional area to be measured, at step S1, and a transfer matrix is calculated with respect to positions of all the sensors at step S2. Then, EfI values $EfI_{path}$ are obtained for respective paths of each of the sensors by performing SVD with respect to the calculated transfer matrix at step S3. An EfI value $EfI_{sensor}$ of each of the sensors is obtained by summing up the EfI values $EfI_{path}$ obtained for the respective paths and a contribution degree of each of the sensors to arrangement of a temperature field is measured on the basis of the obtained EfI value $EfI_{sensor}$ at step S4.

Subsequently, one having a smallest one of the obtained EfI values $EfI_{sensor}$ is removed from among the sensors at step S5 and the above steps S2 to S5 are repeated until the number $N_{sensor}$ of the remaining sensors becomes equal to a target value $N_{target}$. At the moment that the number $N_{sensor}$ of the remaining sensors becomes equal to the target value $N_{target}$, those sensors are located at corresponding positions and a coefficient vector and a temperature field are calculated as in the above-stated basic principle respectively at steps S6 and S7.

Preferably, the optimal sensor position determination method shown in FIG. 3 may be computer-readably programmed to execute a sequence of steps as stated above.

The target number $N_{target}$ of the sensors is larger than a minimum number of the sensors, which is found by calculating variations in a conditional number of the transfer matrix while the sensors are reduced in number subsequently to the above step S1 and detecting a point (or minimum point) where the conditional number increases abruptly, namely, a point where an error of the temperature field abruptly increases, from a curved line obtained as a result of the calculation. In other words, because variations in the conditional number of the transfer matrix have a correlation with variations in an error or the number of the sensors, a desired minimum number of the sensors can be discovered from the variations in the conditional number. Therefore, the target number $N_{target}$ of the sensors can be obtained by the above method for obtaining the minimum number of the sensors.

Next, a description will be given of a simulation for verification of the effect of the method proposed in the present invention.

Figure 4A:
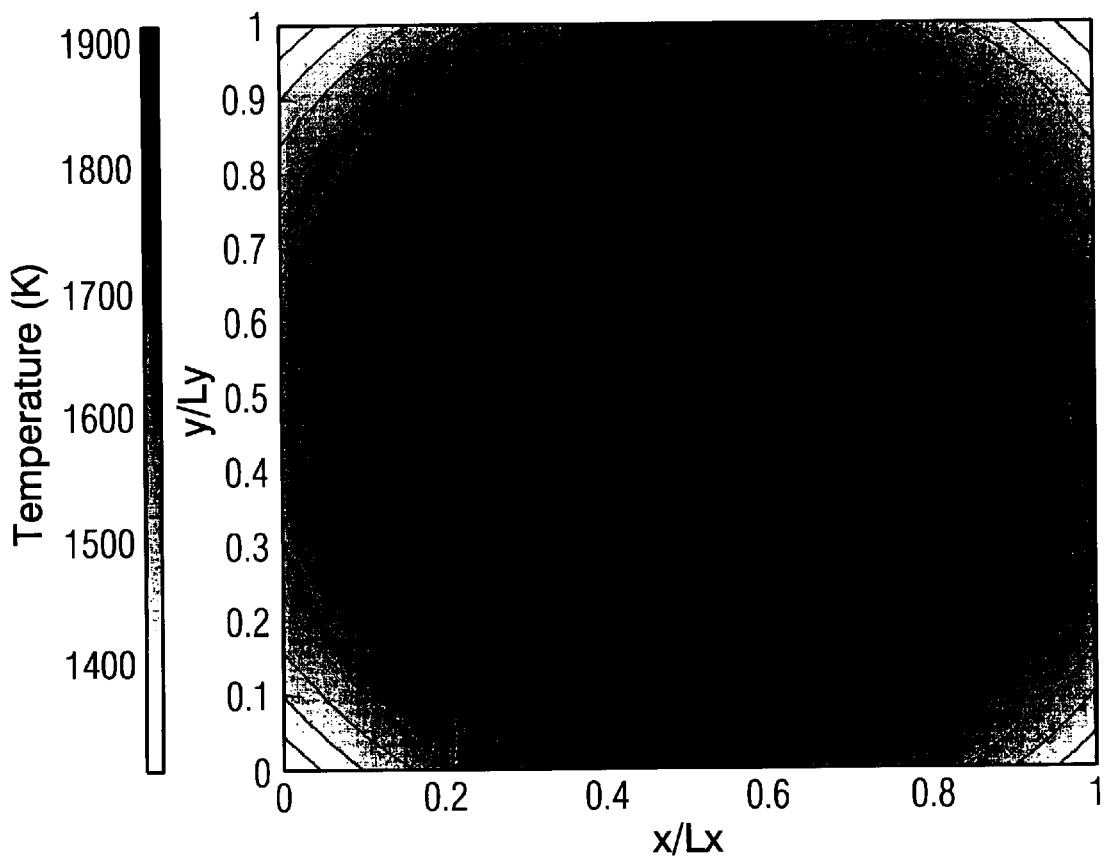
FIGS. 4a and 4b are views showing temperature distributions T1 and T2 assumed for a simulation of the present invention, respectively.
Figure 4B:
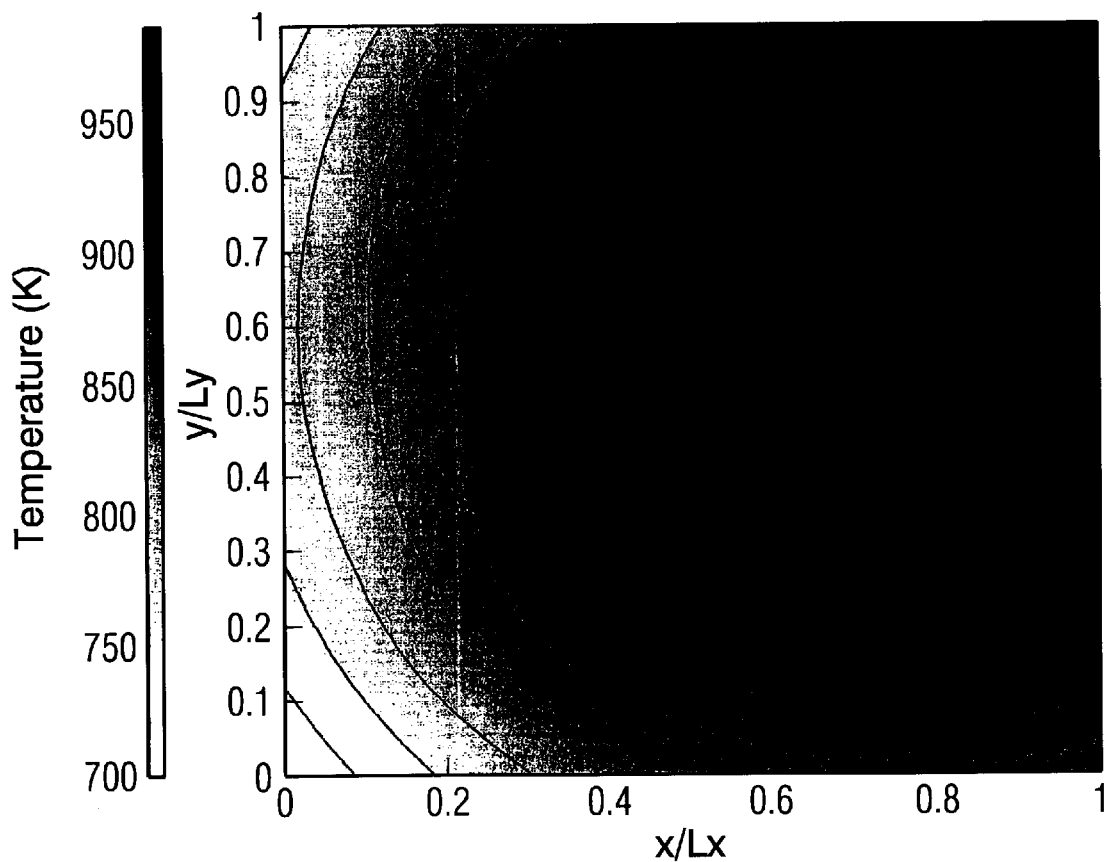

FIGS. 4a and 4b are views showing temperature distributions T1 and T2 assumed for a simulation of the present invention, respectively.

As seen from FIGS. 4a and 4b, the simulation was carried out under the condition that the temperature distributions T1 and T2 were assumed for verification of the effect of the present method. Time required for a sound to be propagated between two arbitrary points in the assumed temperature distributions T1 and T2 was calculated through a numerical integration. A rectangular formula as in the below equation 16 can be used for the numerical integration of the time required for the sound propagation between the two points. It should be noted that any numerical integration formula can be used so long as it has no effect on accuracy.

$$t = \int_A^B \frac{dl}{C(x, y)} \approx \sum_{i=1}^{N} t_i = \sum_{i=1}^{N} \frac{\Delta l}{C(x_{i-1}, y_{i-1})}$$ [Equation 16]

On the other hand, when there is a temperature variation on a sound propagation path, the sound is refracted from a high-temperature point to a low-temperature point. The bending of the sound propagation path resulting from such refraction can be expressed on the basis of Snell's law and Eikonal equation as in the following equation 17.

$$\frac{d\phi(x, y)}{dl(x, y)} =$$ [Equation 17]

$$\frac{\sin\phi(x, y)}{c(x, y)} \frac{\partial c(x, y)}{\partial x} - \frac{\cos\phi(x, y)}{c(x, y)} \frac{\partial c(x, y)}{\partial y} \approx \frac{\Delta\phi(x, y)}{\Delta l(x, y)}$$

$$\frac{\partial x}{\partial l(x, y)} = \cos\phi(x, y) \approx \frac{\Delta x}{\Delta l(x, y)}$$

$$\frac{\partial y}{\partial l(x, y)} = \sin\phi(x, y) \approx \frac{\Delta y}{\Delta l(x, y)}$$

where, $\phi(x, y)$ represents a travel angle of the sound propagation path at each point.

In this connection, in the present simulation, the time required for he sound propagation between the two points in the assumed temperature fields was calculated in consideration of refraction on the basis of the above equations 16 and 17.

FIGS. 5a to 5d and FIG. 6 show the comparison between sensor positions determined according to the present method and sensor positions arranged according to four different methods. For series expansion, the number q of coefficients was set to 11 and the number of sensors was set to 8. In FIGS. 5a to 5d and FIG. 6, different sensor arrangements were made on the basis of the following criteria:

POSITION 1: the same number of sensors were arranged on each side of a rectangular sectional area at intervals of 3:4:3;

POSITION 2: the same number of sensors were arranged on each side of a rectangular sectional area at regular intervals;

POSITION 3: a plurality of sensors were arranged along the entire edge of a rectangular sectional area at regular intervals;

POSITION 4: a plurality of sensors were arranged along the entire edge of a rectangular sectional area at irregular intervals; and POSITION EfI: a predetermined number of sensors were arranged along the entire edge of a rectangular sectional area according to the present method.

Figure 5:
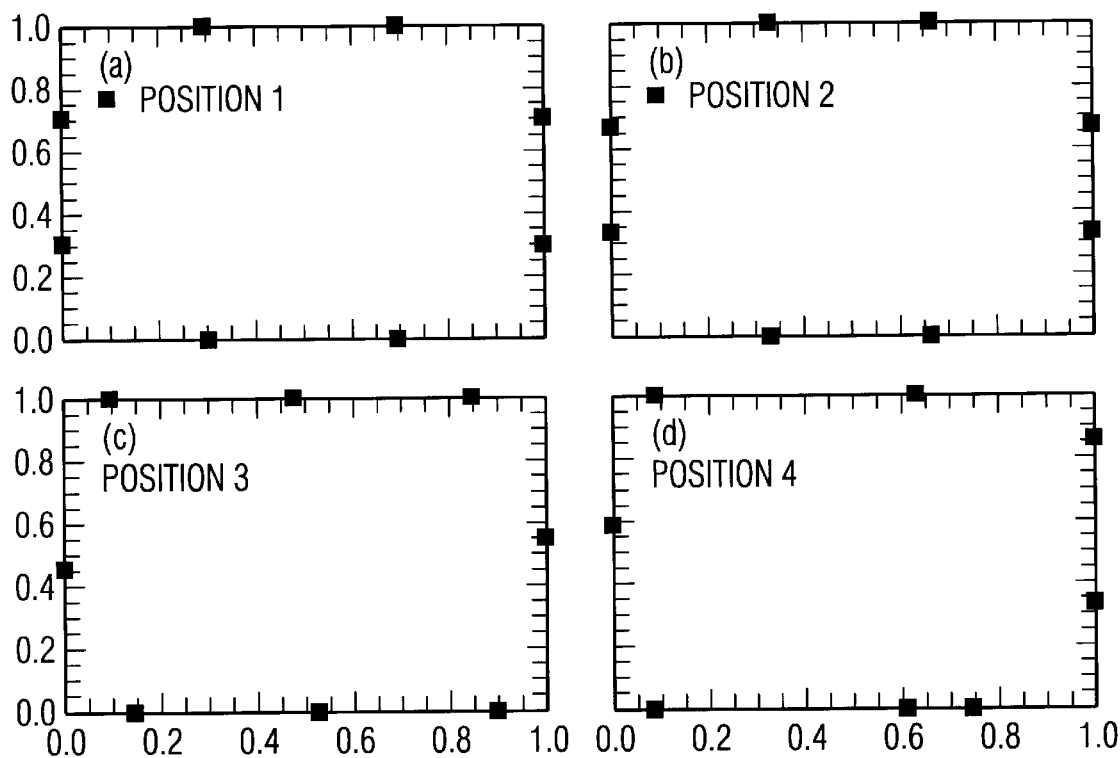
FIG. 5 is a view showing the arrangement of sensors at arbitrary positions for the simulation of the present invention.
Figure 6:
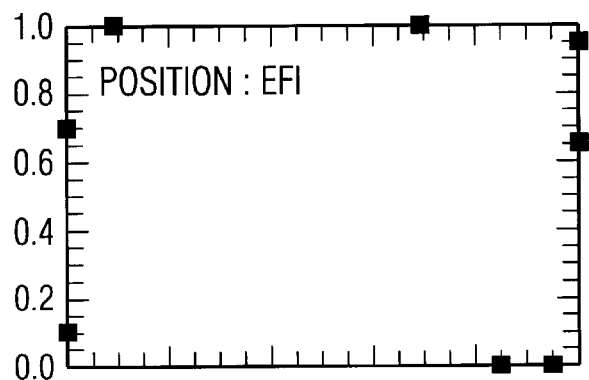
FIG. 6 is a view showing the arrangement of sensors at positions determined according to the present method.

FIGS. 5a and 5d are views showing the arrangement of sensors at arbitrary positions for the simulation of the present invention and FIG. 6 is a view showing the arrangement of sensors at positions determined according to the present method. Also, FIGS. 7a to 7e are views illustrating the measured results of the temperature distribution T1 and FIGS. 8a to 8e are views illustrating the measured results of the temperature distribution T2. The below table 1 shows root mean square (RMS) errors based on sensor positions, table 2 shows average, minimum and maximum temperatures measured according to sensor positions and table 3 shows minimum numbers of sensors necessary to measurement of the temperature distributions T1 and T2, depending on the numbers q of coefficients.

TABLE 1

NUMBER OF SENSORS: 8
| NUMBER OF COEFFICIENTS: 11 | Error (T1) % | Error (T2) % |
| --- | --- | --- |
| Position EfI | 3.71 E − 00 | 3.48 E + 00 |
| Position 1 | 5.25 E + 00 | 1.04 E + 01 |
| Position 2 | 3.87 E + 00 | 1.21 E + 01 |
| Position 3 | 1.80 E + 02 | 4.51 E + 02 |
| Position 4 | 7.36 E + 02 | 9.93 E + 02 |

TABLE 2

| | T1 (K) | | | T2 (K) | | |
| --- | --- | --- | --- | --- | --- | --- |
| | AVERAGE | MINIMUM | MAXIMUM | AVERAGE | MINIMUM | MAXIMUM |
| Actual | 1706 | 1314 | 1914 | 869 | 700 | 987 |
| Position EfI | 1713 | 1366 | 2044 | 874 | 708 | 1015 |
| Position 1 | 1703 | 1072 | 1970 | 884 | 411 | 1245 |
| Position 2 | 1692 | 1257 | 1922 | 883 | 379 | 1374 |
| Position 3 | 646 | 0.14 | 21024 | 834 | 0.18 | 27050 |
| Position 4 | 4576 | 6.5 | 68397 | 3079 | 4.4 | 46014 |

TABLE 3

| NUMBER OF COEFFICIENTS (Q) | MINIMUM NUMBER OF SENSORS BASED ON VARIATIONS IN CONDITIONAL NUMBER | MINIMUM NUMBER OF SENSORS BASED ON RMS ERRORS |
| --- | --- | --- |
| 11 | 8 | 8 |
| 15 | 8 | 8 |
| 20 | 10 | 10 |
| 30 | 13 | 13 |
| 40 | 15 | 15 |

Figure 7A:
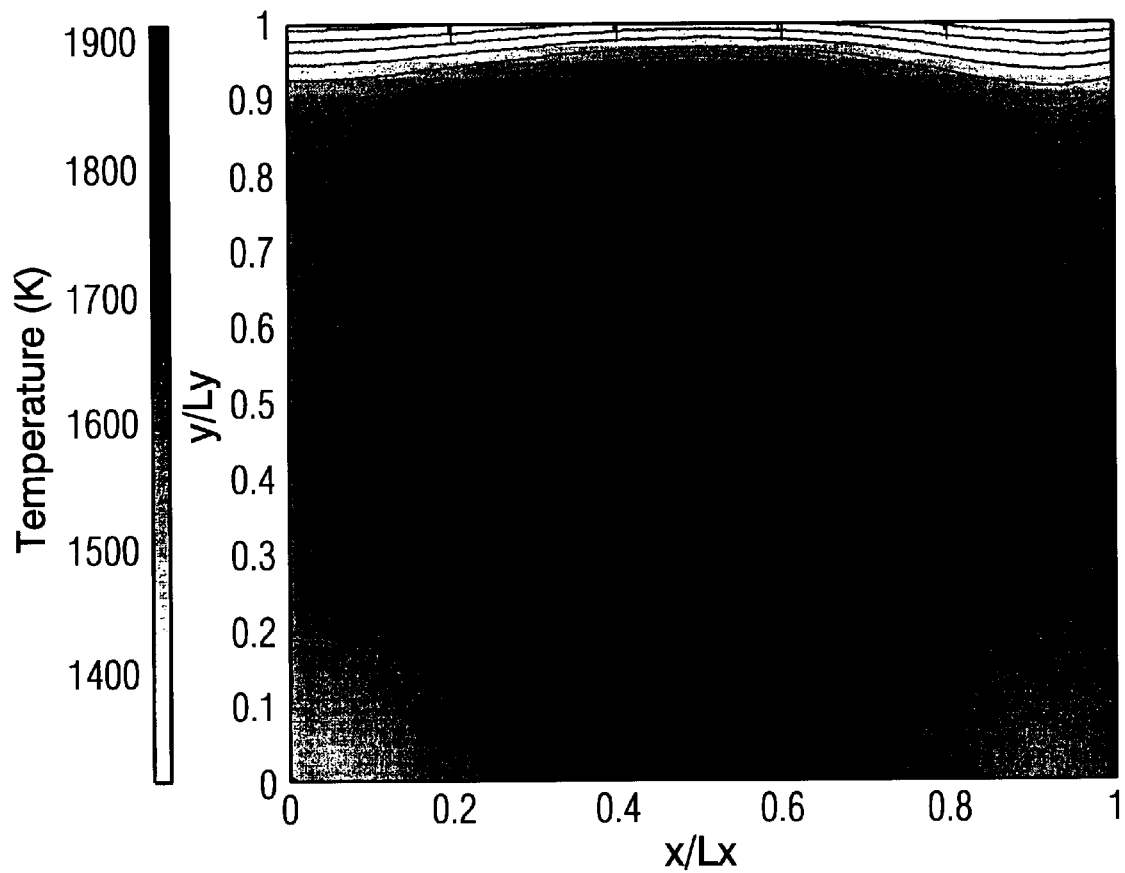
FIGS. 7a to 7e are views illustrating the measured results of the temperature distribution T1.
Figure 7B:
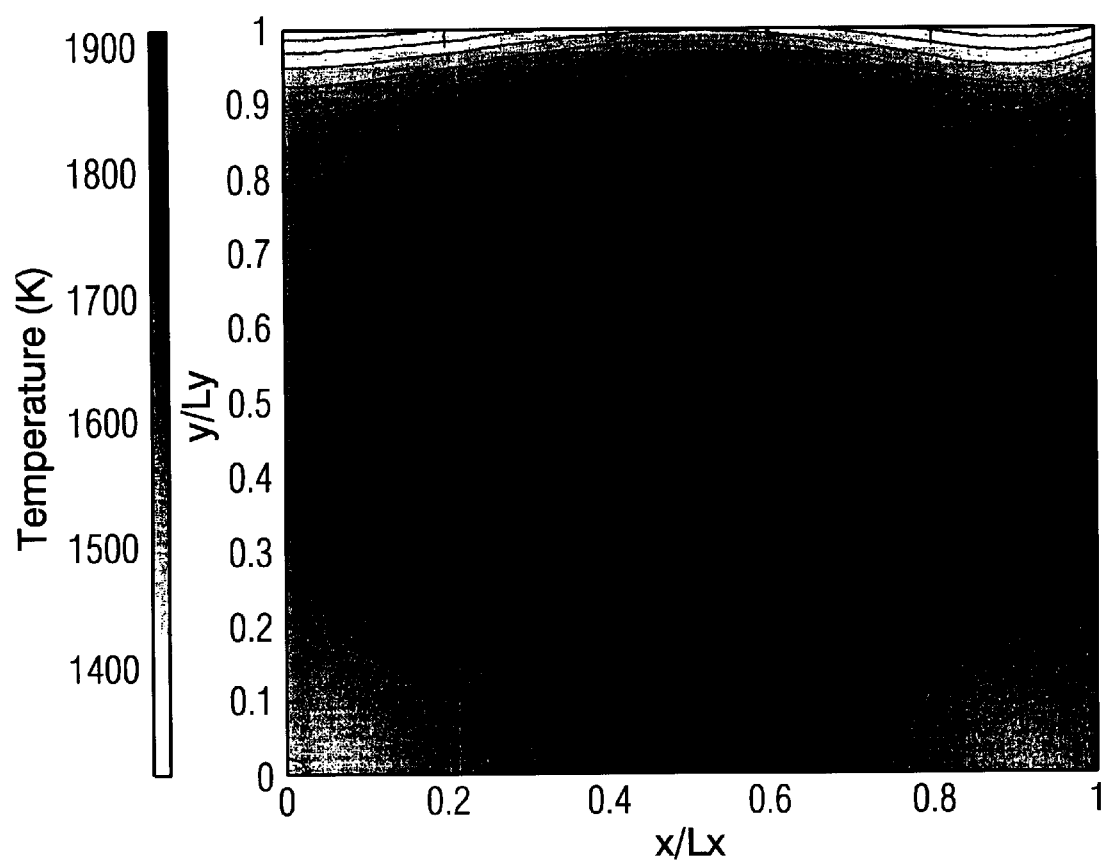
Figure 7C:
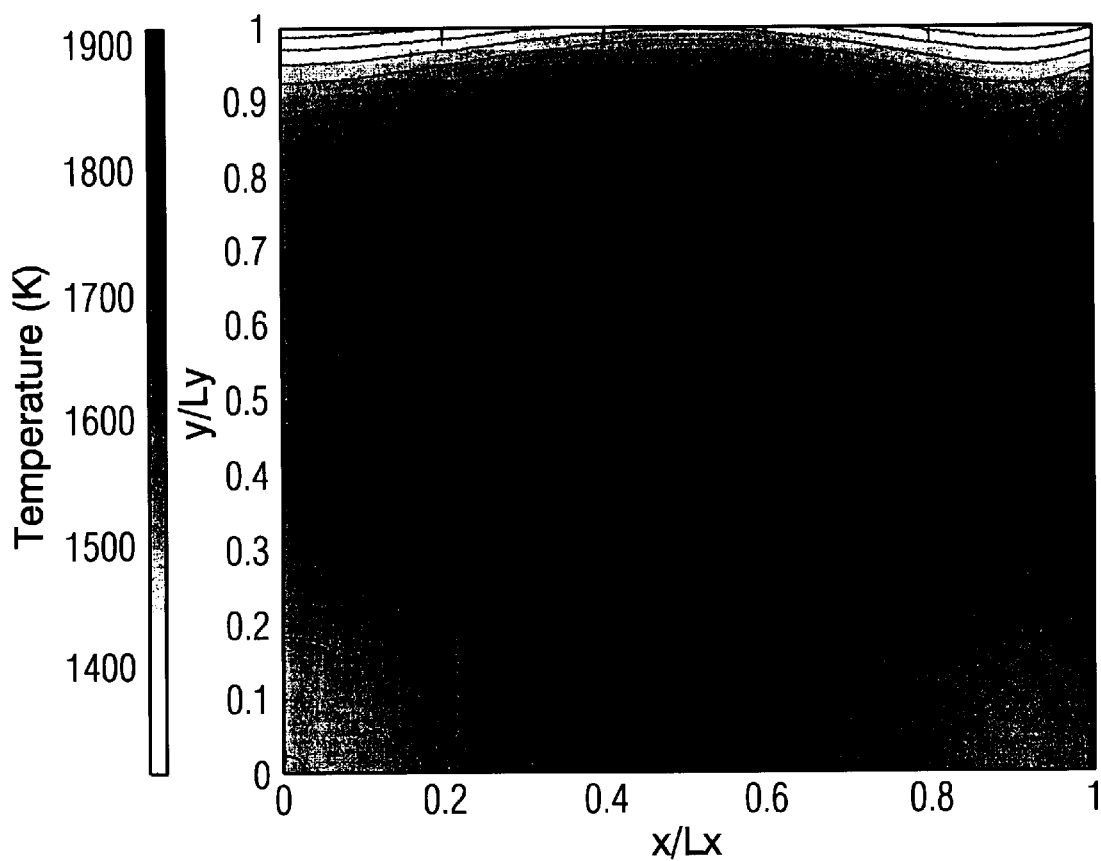
Figure 7D:
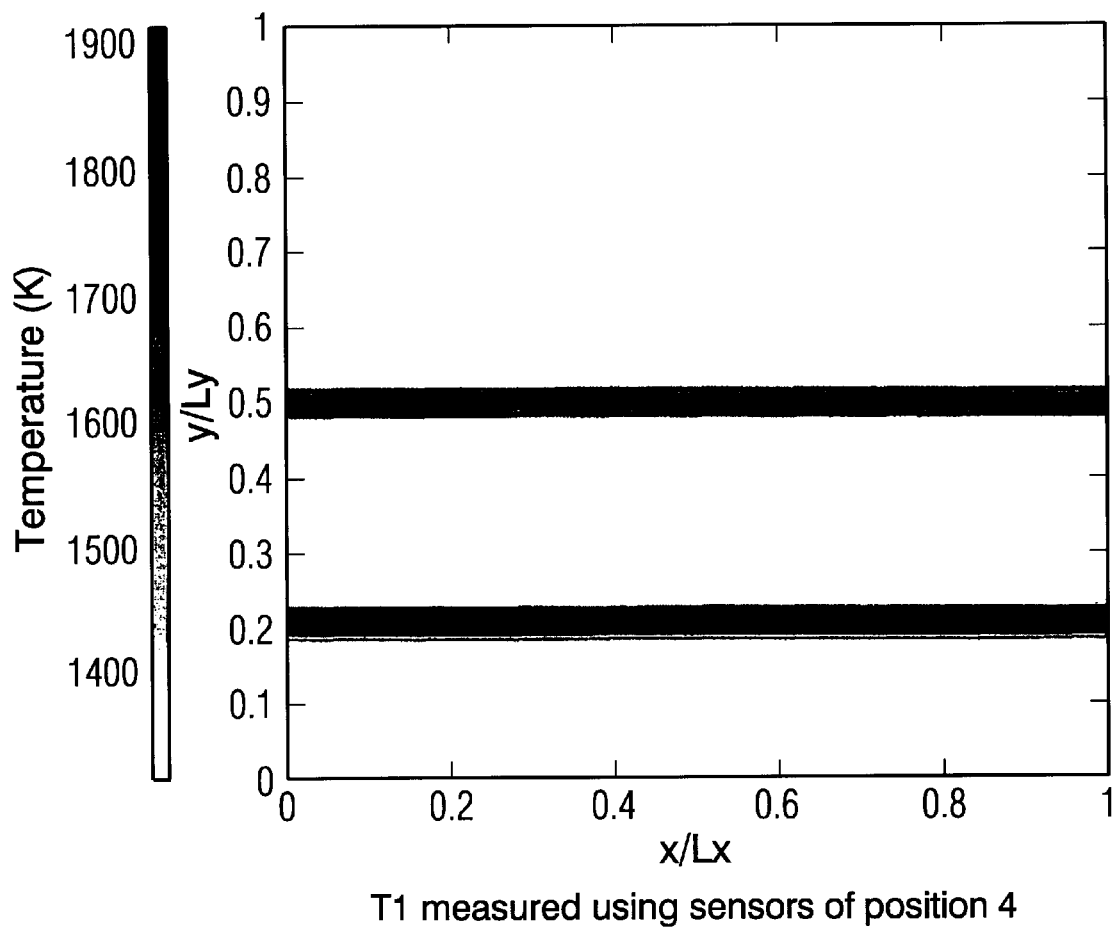
Figure 7E:
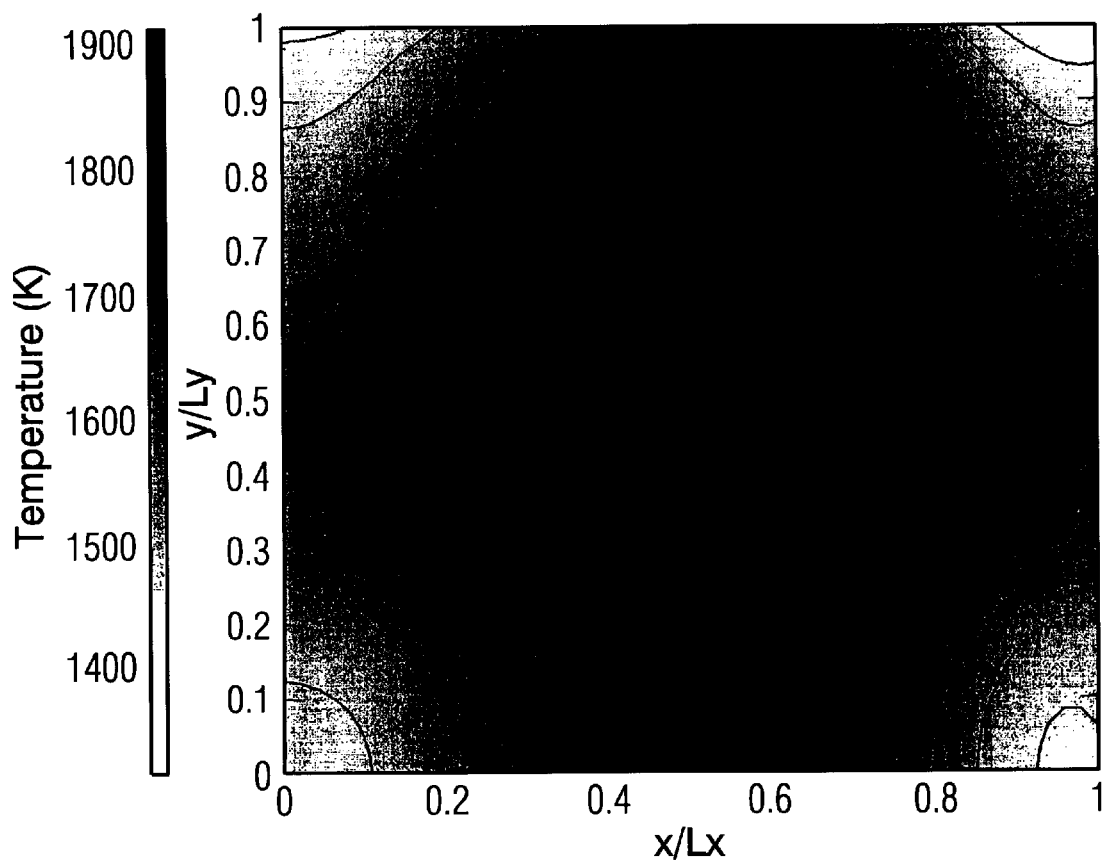
Figure 8A:
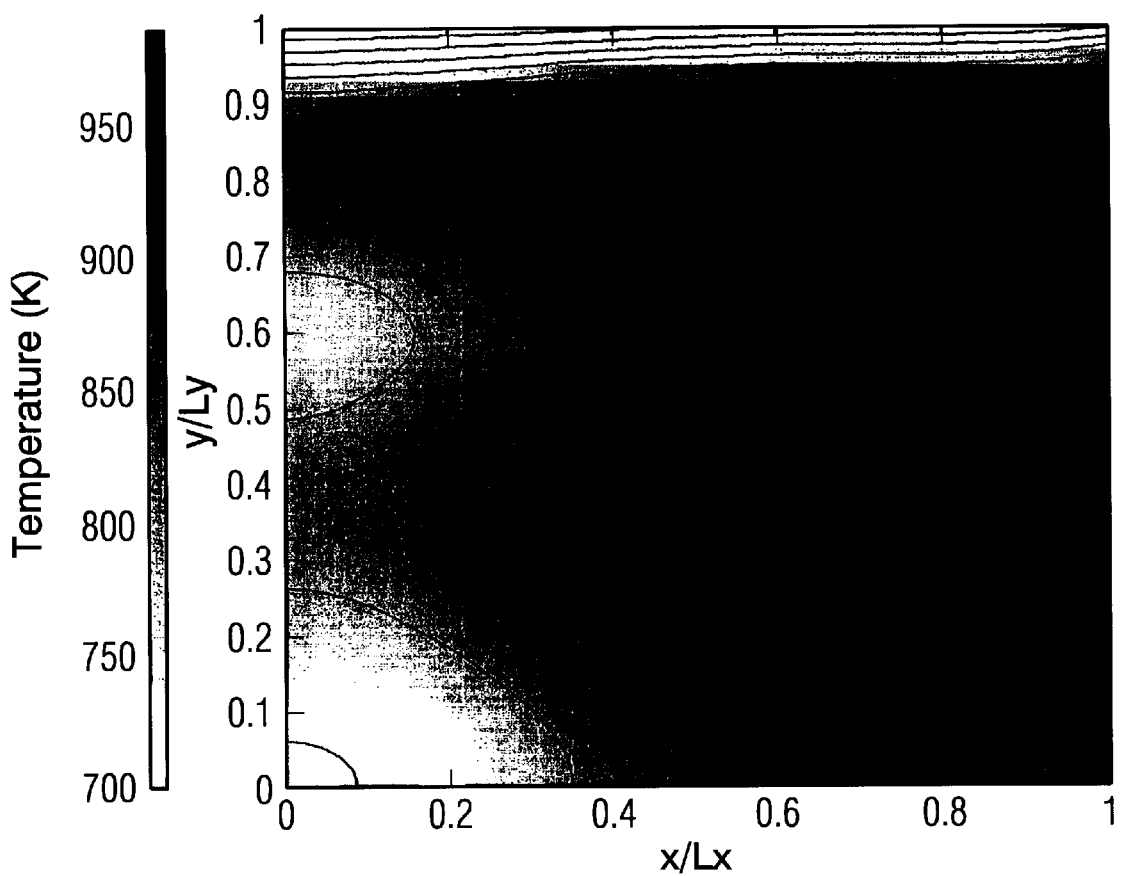
FIGS. 8a to 8e are views illustrating the measured results of the temperature distribution T2.
Figure 8B:
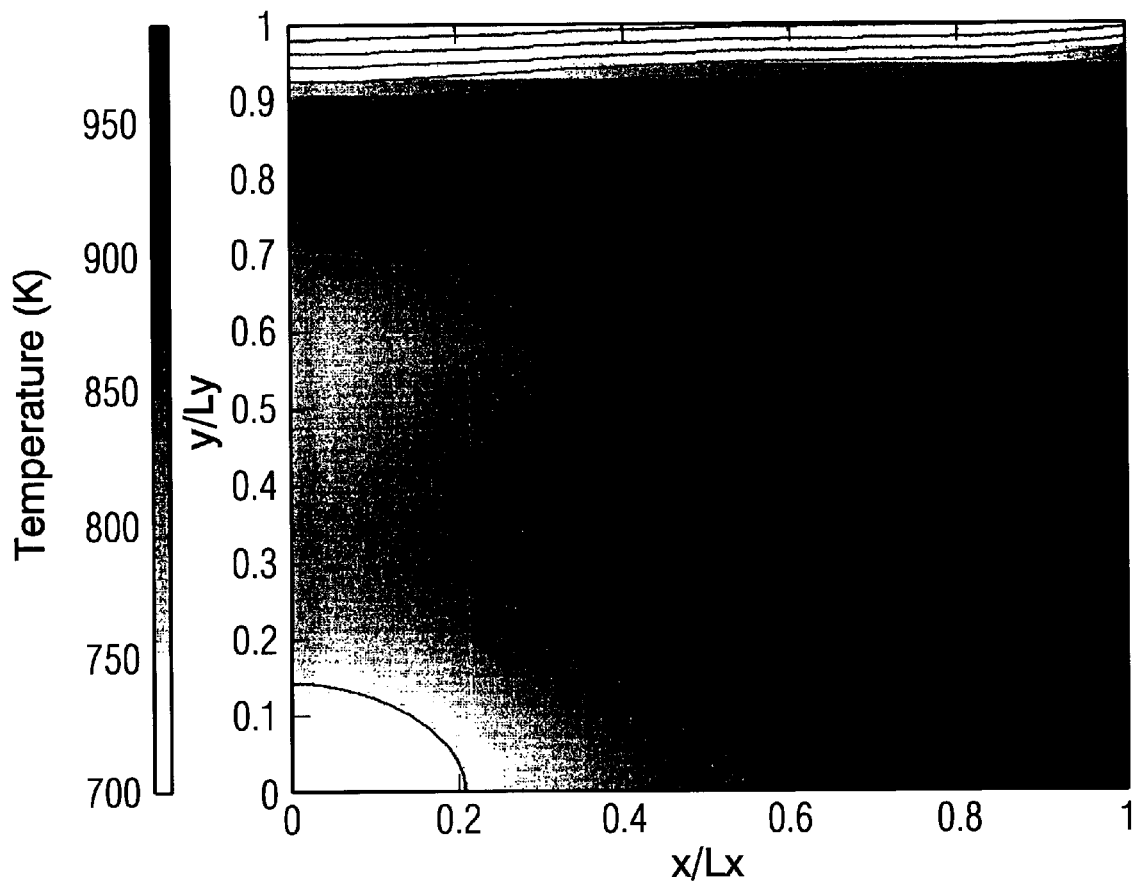
Figure 8C:
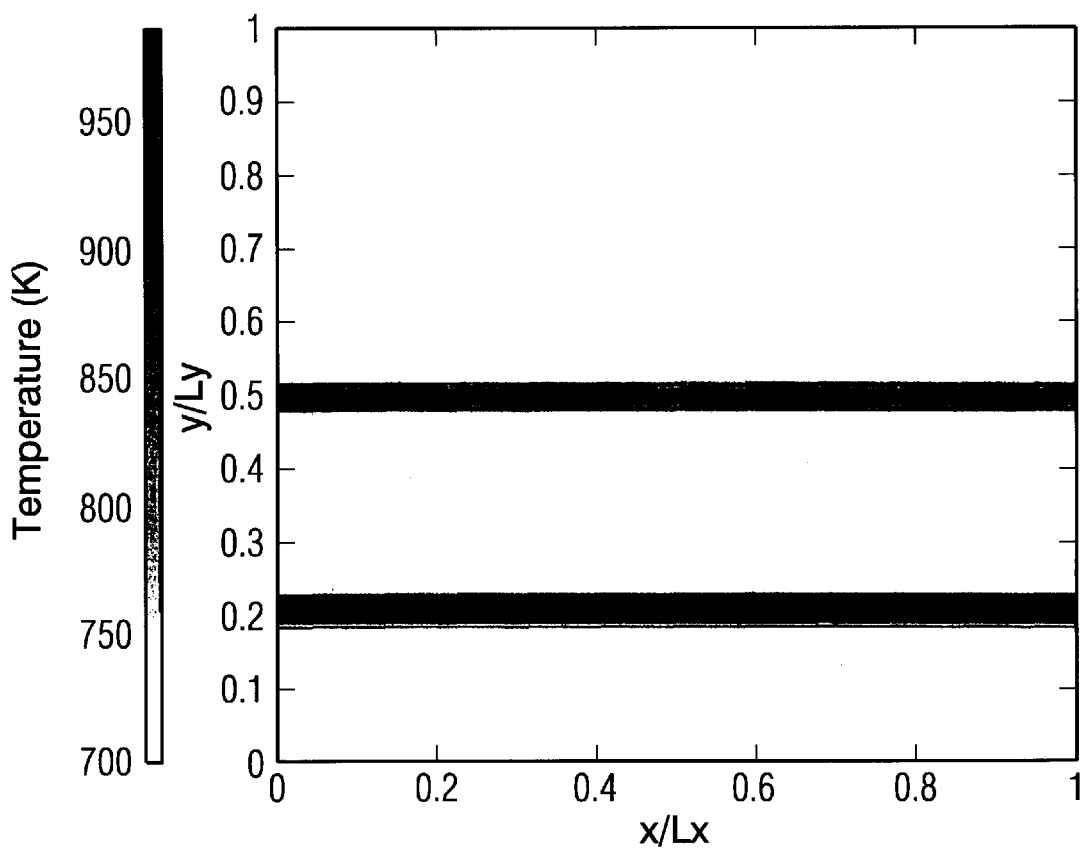
Figure 8D:
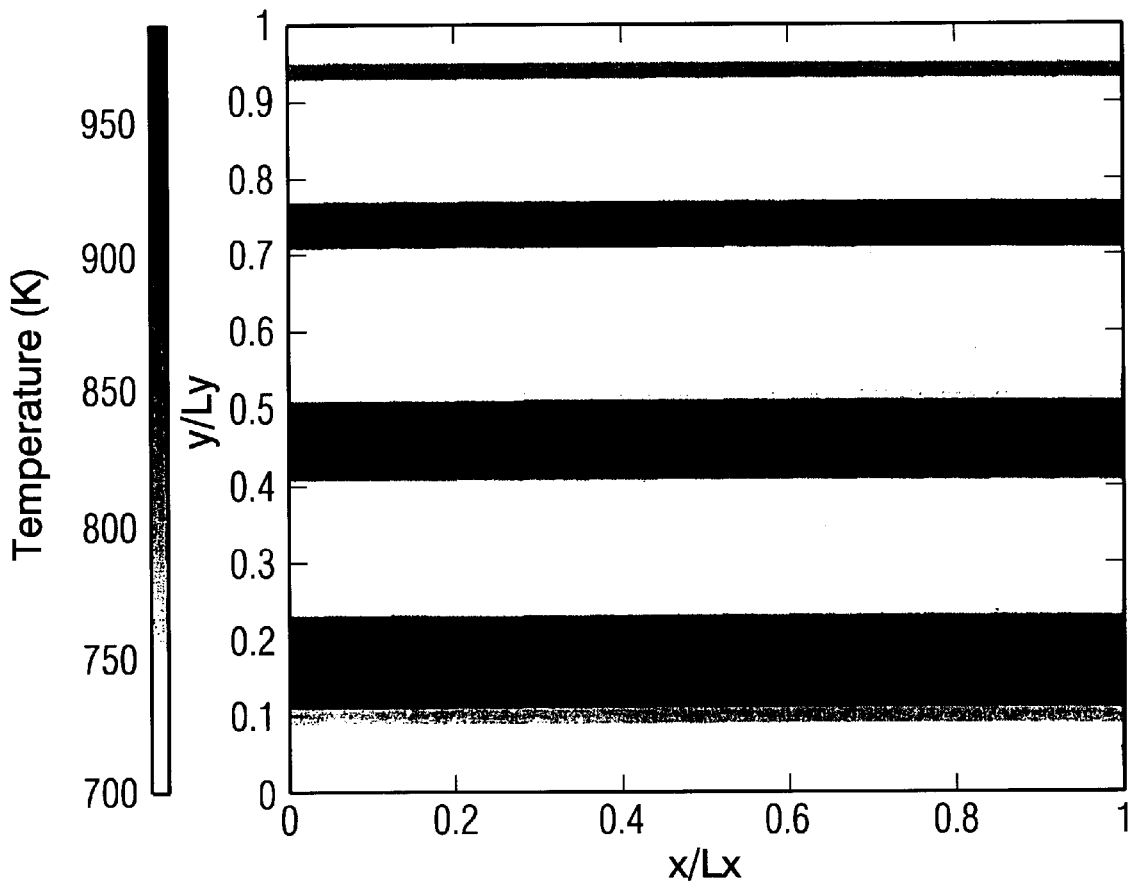
Figure 8E:
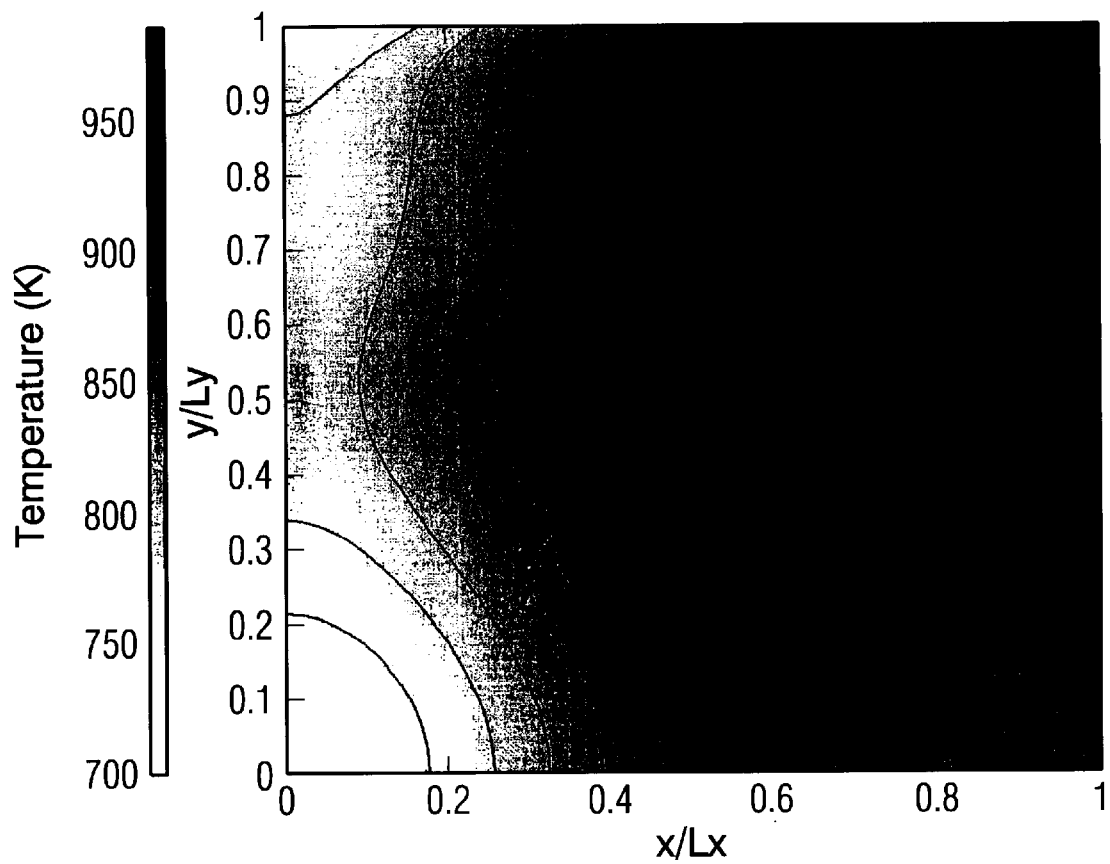

As seen from FIGS. 7a to 7e, FIGS. 8a to 8e and the above tables 1 and 2, the measured results based on the sensor arrangement of the present invention exhibited the smallest errors (see FIGS. 7e and 8e). In the worst case resulting from the misarrangement of sensors, the temperature distributions T1 and T2 were extremely preposterously estimated (see FIGS. 7c, 7d, 8c and 8d).

The numbers of necessary sensors were different according to the numbers q of coefficients as seen from the above table 3. In this regard, with he number q of coefficients determined, a minimum number of sensors will be known through the simulation.

As apparent from the above description, the present invention provides a method for optimally determining sensor positions for an acoustic pyrometry, which is capable of obtaining a minimum number of sensors satisfying a given error limit and determining positions of the obtained number of sensors suitable for error minimization. Therefore, the present method can much more accurately measure temperature distributions using the same number of sensors as that in conventional methods.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for optimally determining sensor positions for an acoustic pyrometry, comprising the steps of:
    a) arbitrarily arranging a predetermined number of sensors on sides of a rectangular sectional area to be measured;
    b) calculating a transfer matrix with respect to positions of all of said sensors;
    c) obtaining effective independence values of respective paths of each of said sensors by performing singular value decomposition with respect to the calculated transfer matrix;
    d) obtaining a total effective independence value of each of said sensors by summing up the obtained effective independence values of said respective paths;
    e) removing one having a smallest one of the obtained total effective independence values from among said sensors; and
    f) repeating said steps b) to e) until the number of the remaining sensors becomes equal to a target value.

2. The method as set forth in claim 1, wherein said target value is set to be larger than a minimum number of said sensors, said minimum number being found by calculating variations in a conditional number of said transfer matrix while said sensors are reduced in number and detecting a point where the conditional number increases abruptly or a minimum point from a curved line obtained as a result of the calculation.

3. A computer-readable storage medium for storing a program configured to execute the steps of:
    a) arbitrarily arranging a predetermined number of sensors on sides of a rectangular sectional area to be measured;
    b) calculating a transfer matrix with respect to positions of all of said sensors;
    c) obtaining effective independence values of respective paths of each of said sensors by performing singular value decomposition with respect to the calculated transfer matrix;
    d) obtaining a total effective independence value of each of said sensors by summing up the obtained effective independence values of said respective paths;
    e) removing one having a smallest one of the obtained total effective independence values from among said sensors; and
    f) repeating said steps b) to e) until the number of the remaining sensors becomes equal to a target value.

* * * * *